United States Patent [19]

DeFrees

[11] 4,009,862

[45] Mar. 1, 1977

[54] HYDRAULICALLY BALANCED REMOTE CONTROLLED EMERGENCY VALVE FOR STORAGE TANK

[76] Inventor: Joseph H. DeFrees, 414 Liberty St., Warren, Pa. 16365

[22] Filed: Aug. 22, 1975

[21] Appl. No.: 606,925

[52] U.S. Cl. .................... 251/63; 251/63.5; 251/144

[51] Int. Cl.² .......................... F16K 31/122

[58] Field of Search .......... 251/144, 63, 63.6, 63.5; 277/152

[56] References Cited

UNITED STATES PATENTS

| | | | |
|---|---|---|---|
| 2,049,997 | 8/1936 | Eaton | 251/63.5 X |
| 2,319,392 | 5/1943 | Dick | 277/152 X |
| 2,361,225 | 10/1944 | Meyer | 251/63 X |
| 2,436,612 | 2/1948 | Sheets | 277/152 X |
| 2,442,625 | 6/1948 | Thomas | 137/219 |
| 2,726,840 | 12/1955 | Jurs et al. | 251/144 X |
| 3,065,949 | 11/1962 | DeFrees | 251/144 X |
| 3,257,093 | 6/1966 | DeFrees | 251/144 X |
| 3,392,956 | 7/1968 | DeFrees | 251/144 |
| 3,397,893 | 8/1968 | Kampert | 277/125 X |

*Primary Examiner*—Arnold Rosenthal
*Attorney, Agent, or Firm*—Baldwin, Egan, Walling & Fetzer

[57] ABSTRACT

A remotely controlled fluid pressure actuated internal emergency valve for the outlet opening of a liquid storage tank, for automatically closing the outlet port in the valve in the event of various emergency situations, and which also is adapted for bottom liquid loading or filling of the tank. The valve embodies means hydraulically balancing the movable housing of the valve, whereby the associated biasing means for the valve is effective to move the valve housing to closed position during bottom loading of the tank upon predetermined exhaustion of actuating fluid from the actuating pressure chamber of the valve. The valve is relatively simple in construction and highly effective in operation.

13 Claims, 5 Drawing Figures

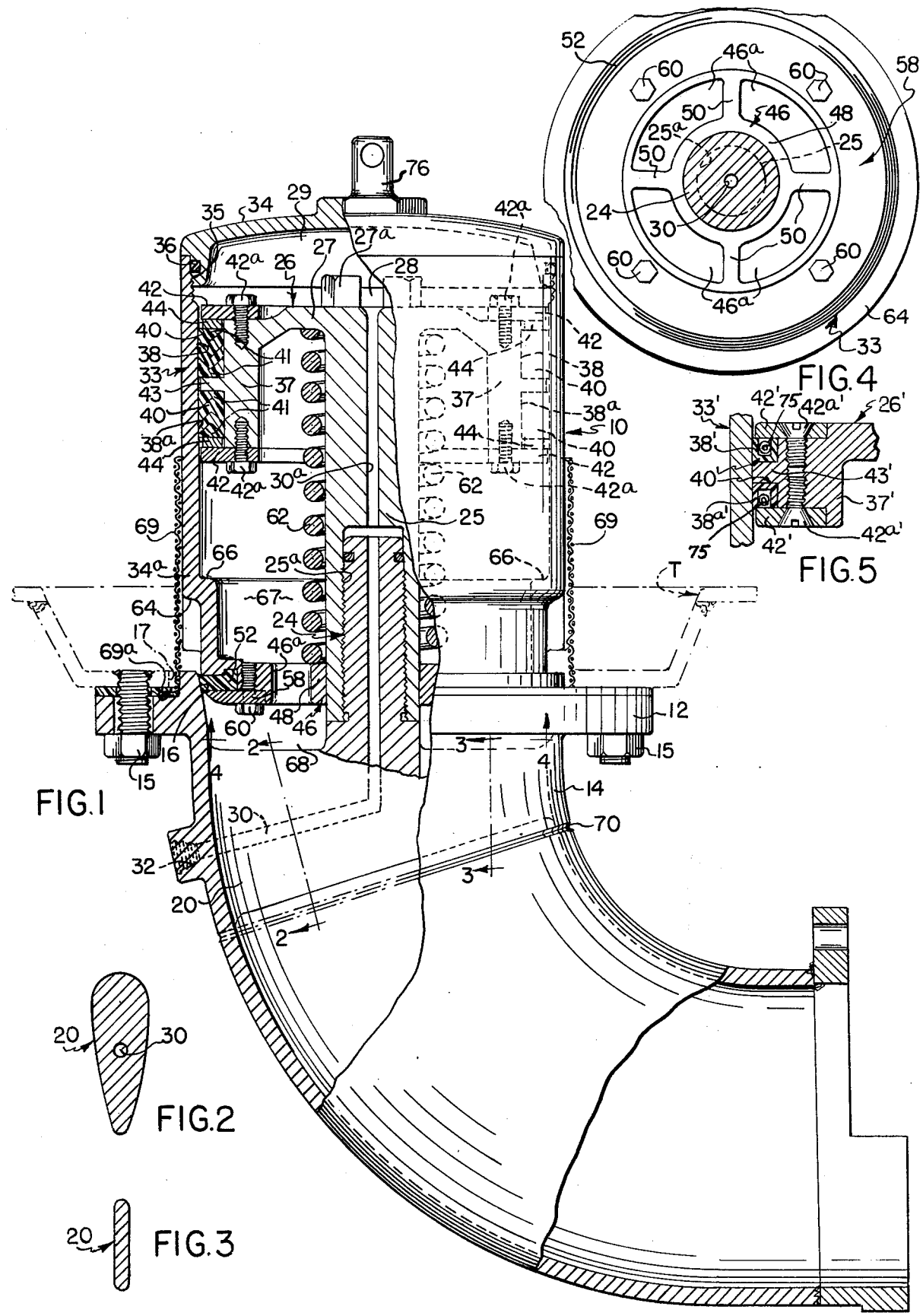

HYDRAULICALLY BALANCED REMOTE CONTROLLED EMERGENCY VALVE FOR STORAGE TANK

This invention relates in general to safety valve mechanism for a transportation tank or storage tank, such as for instance a tank truck or trailer, used for transportation of various types of liquids (e.g. gasoline, chemicals, oils etc.) or for storage of such liquids, and more particularly, relates to a remotely controllable emergency valve which operates to effectively control the flow of liquid from the tank, and which embodies means for hydraulically balancing the movable valve housing, whereby the latter may be effectively moved to a closed position during bottom loading of the tank upon predetermined release of actuating fluid from the actuating chamber of the valve.

Background of the Invention

Various types of remotely controllable emergency valves including internal type valves, are well known in the prior art. For example, a valve of this general type is shown in U.S. Pat. No. 3,257,093 issued June 21, 1966 to Joseph H. DeFrees, as well as in U.S. Pat No. 3,392,956 issued July 16, 1968 to Joseph H. DeFrees. In various of such safety valves when used in a bottom loading operation, a problem arises in that hydraulic pressures on the valve during the bottom loading operation sometimes prevents the valve from effectively closing under an emergency situation, and this is so even though the actuating fluid to the valve actuating chamber is exhausted or terminated. Accordingly, the valve may not automatically close as effectively or rapidly as it should during a bottom loading operation, in the event of accident or emergency, and thus it may fail in its basic purpose of preventing inadvertent outflow of the liquid from the associated tank, or could result in mingling of loads in a multi-chambered tank.

Summary of the Invention

The present invention provides an internal type remotely controllable emergency valve for a storage tank such as a tank truck, wherein the valve is relatively simple in construction, will operate effectively to control the flow of liquid from the tank, and wherein the valve includes means for hydraulically balancing the same during "bottom loading" of the tank, whereby conventional biasing means for the valve is effective to quickly move the valve housing to closed position against the valve seat upon predetermined exhaustion of pressurized fluid from the actuating chamber thereof during a bottom loading operation, and will even move to closed position upon said exhaustion of the actuating fluid, without energization from said biasing means.

Accordingly, an object of the invention is to provide a novel internal type, remotely controllable emergency valve for the outlet of a liquid storage tank.

Another object of the invention is to provide a novel emergency valve of the aforementioned type that is simple in construction and effective in operation to prevent inadvertent discharge of liquid in the tank in the event of accident, and wherein the valve is hydraulically balanced so that during bottom loading of liquid into the tank, the biasing means for the valve is effective to move the closure housing to closed position upon predetermined exhaustion of actuating fluid from the valve actuation system, and which will prevent opening of the valve in the event of hook-up error.

A still further object of the invention is to provide a valve of the latter mentioned type which includes a lower valve housing portion of a lesser diameter as compared to the upper portion of the valve housing, so as to provide an increased effective area for the wall of the valve housing to compensate for and generally "hydraulically balance" or hydraulically over-balance the valve housing.

Other objects and advantages of the invention will be apparent from the following description taken in conjunction with the accompanying drawings wherein:

BRIEF DESCRIPTION OF THE DRAWINGS

FIG. 1 is a sectional, elevational view of a valve embodying the invention, and showing the valve housing in closed condition on the bottom wall of a storage tank.

FIG. 2 is a bottom planned view taken generally along the plane of line 2—2 of FIG. 1, looking in the direction of the arrows.

FIG. 3 is a sectional view taken generally along the plane of line 3—3 of FIG. 1 looking in the direction of the arrows.

FIG. 4 is a further sectional view taken generally along the plane of line 4—4 of FIG. 1 looking in the direction of the arrows.

FIG. 5 is a fragmentary sectional view, illustrating another sealing means of the piston of an emergency valve as compared to the sealing arrangement between the piston and the valve housing of FIG. 1.

DESCRIPTION OF PREFERRED EMBODIMENTS

Referring now again to the drawings, there is shown a valve 10 embodying the invention and including a base 12 in the form of an annular ring (FIG. 1) having, in the embodiment illustrated, an elbow 14 secured thereto or integrally formed therewith and depending therefrom. Valve 10 may be secured as by fasteners 15 in an opening 17 in the bottom wall of the tank T.

Base 12 defines a generally circular valve port 16. Vane structure 20 is disposed in the interior of elbow 14 below port 16 and extends across the elbow interior as shown. Vane 20 is of streamline exterior configuration as can be best seen in FIGS. 2 and 3, for aiding in preventing turbulence of the liquid as it passes through the valve port 16. It will be seen that the inverted air foil configuration in cross section of vane 20 aids in smoothing the flow of liquid flowing through the port. Vane 20 preferably tapers in a direction from the left-hand side thereof to the right-hand side thereof as can be seen in FIGS. 3 and 4, and both in a vertical and in a transverse dimension.

Extending upwardly from the vane 20 and supported thereby is a threaded post 24. Piston stem 25 of piston 26 is interiorly threaded as at 25a and is received in threaded coaction with the post 24, to mount the piston in upwardly projecting relation with respect to the port 16 in valve base 12. The piston head 27 may be provided with a lug 27a for aiding in threading the piston onto the threaded post 24. Lug 27a may be slotted as at 28 to ensure drainage of any leakage and/or condensate from the actuating chamber of the valve.

A passageway 30 is provided communicating with the exterior of elbow 14 as by means of threaded coupling port 32, with the passageway 30 passing through the vane 20 as can be best seen in FIGS. 1 and 2, and then passing upwardly through the post 24. An aligned passageway 30a passes through the piston stem 25 and into communication with the aforementioned actuating chamber 29. Passageway 30 in vane 20 is preferably obliquely disposed with respect to the horizontal, and as can be seen in FIG. 1.

Actuating chamber 29 is defined by the piston 26 in conjunction with the valve housing 33 which is of generally cylindrical exterior configuration, and which comprises a two piece construction arrangement including an upper portion 34 and a side wall portion 34a, which are preferably threaded together as at 35, and which include a seal or O-ring 36, for making a fluid tight connection therebetween.

The piston head 27 has a downwardly projecting or depending shoulder portion 37 comprising an upper recess or chamber 38 and a lower recess or chamber 38a extending circumferentially of the piston head. Sealing means 40 are disposed in recesses 38, 38a and bear in sealing relation against the smooth interior surface of valve housing 33. In the embodiment illustrated, the sealing means 40 comprise V-shaped (in cross section) rings, with the rings in the lower chamber 38a of the piston head being inverted with respect to the sealing rings in the upper chamber. Associated with each pair of sealing rings are male and female adapter 41. The sealing rings and associated adaptors 41 may be formed of any suitable material, such as for instance "Teflon," and effectively seal the movement of the valve housing 33 with respect to the stationary piston head. Circular plates 42 secured as for instance by threaded fasteners 42a support the sealing rings and adaptors in position between the center web 43 of shoulder portion 37 and the respective plate 42 and in the respective chamber 38, 38a, and a wave spring or washer 44 may be provided in each recess for urging the respective sealing means into sealing relationship against the interior surface of the valve housing.

The valve housing 33 embodies a bottom wall portion 46 (FIGS. 1 and 4) which is slotted as at 46a and connected to a central apertured hub 48 by ribs 50, so that the majority of the bottom wall 46 of the valve housing is open. A sealing disc member 52, which may be formed of any suitable material, is provided on the bottom wall 46, adapted for coaction with the defining surface of port 16 in the base 12, and which may be held in place by means of retainer plate 58 and associated threaded fasteners 60. Disc 52 is adapted to sealingly engage the tapered defining surface of the port 16 for effectively sealing the port when the valve housing 33 is in closed condition.

A coiled spring 62 or other type of resilient means (FIG. 1) is provided coacting between the underside of the piston head 27 and the bottom wall section 46 of the valve housing 33 for urging the valve housing downwardly away from the piston head and into closed condition, so as to ordinarily maintain the port 16 closed against the egress of liquid from the associated tank.

In accordance with the present invention, the side wall portion 34a of the valve housing is, on its lower section, of a lesser diameter as compared to the diameter of the upper section thereof. In other words, the upper section of the side wall of the valve housing turns outwardly as at 64 (FIG. 1) resulting in additional pressure surface 66 interiorly of the valve housing. The effective pressure area in chamber 67 interiorly of the valve housing thus is substantially the same as the external pressure areaa on the underside of the valve housing in chamber area 68 (FIG. 1) so that the valve housing is substantially hydraulically balanced, and for a purpose and in a manner to be hereinafter described.

A mesh screen collar 69 may be provided which has an outturned flange 69a along its lower periphery, to be received in coacting relationship between the underside of the tank drain wall and the base 12 of the valve, to hold the screen collar 69 in position. The screen is adapted to intercept objects which may be for instance objects inadvertently dropped into an upper manhole or access opening to the tank, or which may be scale from the tank interior, and prevents the movement of such objects through the port 16 into the elbow 14 of the valve assembly.

The elbow 14, which may be of the cast and fabricated construction illustrated, preferably has a circumferential groove or breakage line 70 thereon of reduced strength, so that the lower part of the elbow may shear off in the event of an accident or an emergency wherein the elbow is subjected to impact. As can be seen, the break off line 70 is disposed below the passageway 30 and associated coupling port 32.

As aforementioned, the valve may be actuated by application of fluid pressure, such as for instance air pressure via a suitable control valve (not shown) to the coupling port 32 of passageway 30 whereupon it passes through passage 30 upwardly through post 24, through the central passageway 30a in the stem of the piston, and into the actuating chamber 29, thereby causing the valve housing 33 to move upwardly relative to the piston 26 and against the resistance to compression of spring 62, and open up the port 16 in the base of the valve. Liquid in the storage tank can then flow outwardly through the port 16 down past the vane 20, through the elbow 14 to a point as determined by hose or line connected to the elbow.

In the event of bottom loading of the tank with the valve mechanism of the invention, pressurized actuating fluid is applied to actuating chamber 29 in order to open the valve, causing the valve housing 33 to move upwardly against the resistance to compression of the spring means away from the valve seat, thereby opening the port 16 and permitting the liquid under pressure to flow via the elbow 14 into the tank. It will be seen that since the pressure area in chamber 67 of the valve is substantially the same as the pressure area in chamber 68, the valve housing is substantially hydraulically balanced. In the event of an emergency wherein it is desired to close the valve, relieving the actuating pressure in the actuating chamber 29 via passageways 30a and 30 will cause the spring 62 to move the valve housing against the inflowing product, to closed position against the valve seat, thereby closing off the port 16. Since the valve housing is substantially hydraulically balanced, with liquid pressure force interiorly of the valve counteracting the liquid pressure force acting on the underside of the valve housing, the valve will rapidly close to effectively shut off the port 16 when actuating fluid is no longer applied to the actuating chamber 29 and passageway 30 is open to exhaust.

Referring to FIG. 5, there is shown a modified form of sealing arrangement for the piston 26 with respect to the valve housing 33. Such modified form comprises annular grooves 38', 38a' in the upper and lower portions of the piston head, similar to the first described embodiment. However, as can be seen, in this arrangement arrangemen the depth of the piston flange 37' is substantially less as compared to the depth of the flange in the first described embodiment. In the upper recess or groove 38' there is disposed a U-shaped (in cross section) piston ring seal, wherein the outer leg of the U seal abuts against the adjacent cylinder or housing wall, to form a wiping and sealing means in coaction therewith, while an inverted U-shaped (in cross section) piston ring seal is disposed in the lower chamber or groove 38a' in the piston head likewise sealing the interior of the piston from the liquid, and forming a wiping and sealing means. The sealing rings may be formed of Teflon or any other suitable material, providing for substantial longevity to the seal. Tension spring 75 is preferably disposed interiorly of the respective sealing ring, with such spring running circumferentially of the piston head between the legs of the U-shaped seal, to aid in maintaining the sealability of the latter.

The aforementioned vane 20 provided in the elbow, aids in controlling flow of liquid through the elbow both during bottom loading of liquid into the tank, and during discharge of liquid from the tank through the port 16. Moreover, the upper end of the valve housing 33 or 33' may be provided with a lug 76 which is adapted for attachment to a push vent of for instance the type shown in U.S. Pat. No. 3,486,528, issued Dec. 30, 1969, to Joseph H. DeFrees.

From the foregoing discussion and accompanying drawings it will be seen that the invention provides a novel remotely controllable emergency valve means for a storage tank, and wherein a valve housing is adapted to control the flow of liquid through a port in the valve, and with means being provided for substantially hydraulically balancing or over balancing the valve housing, whereby the biasing means is effective to rapidly move the housing to closed position during bottom loading of the tank upon predetermined exhaustion of the pressurized fluid from an actuating chamber in the valve. The invention also provides a novel valve arrangement including vane means for mounting a stationary piston of the valve assembly, and which vane means facilitates and alleviates turbulence in the movement of liquid through the valve port, either during loading or unloading operations via the valve.

The terms and expressions which have been used have been used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. A remote controlled valve means for a liquid containing tank having a bottom wall, said bottom wall having an opening therein, said valve means comprising a valve seat adapted for coaction with the opening and defining a valve port, a hollow cylindrical type valve housing reciprocally disposed on said seat to control the flow of liquid through said port from and to the tank, a piston head disposed in said valve housing forming an actuating chamber above the piston head, means connecting the piston head to said seat whereby said housing is adapted to vertically reciprocate on the piston head relative to said seat, means for biasing said housing to a lowered position relative to the piston head whereby said housing is maintained in a normally closed position on the valve seat, means for selectively introducing pressurized fluid into and out of said chamber to reciprocate the housing to and from the valve seat for selectively controlling the flow of liquid through said port, means for generally hydraulically balancing said housing whereby said biasing means is effective to move said housing to closed position during bottom loading of the tank upon predetermined exhaustion of pressurized fluid from said actuating chamber, and wherein said means connecting the piston head to the valve seat and associated discharge port comprises a piston stem, means on the stem for threading the stem to a vertical stud connected to said valve seat, means sealing the threaded connection between said stem and said stud, and passages projecting through said stud and said stem to said chamber, said passages comprising said means for introducing pressurized actuating fluid into and from the chamber.

2. The structure in accordance with claim 1 including a hollow elbow leading from the lower end of the valve seat, said elbow having liquid directing vane means disposed interiorly of the elbow for directing the flow of liquid therethrough, and for aiding in preventing turbulence of the liquid as it passes through said elbow.

3. A structure in accordance with claim 2 wherein at least a portion of said vane is of generally inverted teardrop configuration in transverse section.

4. A structure in accordance with claim 2 wherein said vane means extends completely across said elbow, said means for introducing pressurized fluid into and from said chamber being disposed interiorly of said vane means, and said vane means being of generally inverted teardrop configuration for facilitating abatement of turbulence in the liquid flow through said elbow.

5. A structure in accordance with claim 1 wherein said balancing means includes a structural arrangment for said housing wherein the lower portion of the latter is of a smaller transverse dimension as compared to the upper portion thereof, whereby when said valve means is used for bottom loading of the tank, the pressure force area for application of liquid pressure to the inner and outer sides of the valve housing being substantially the same, resulting in a substantially hydraulically balanced valve mechanism.

6. A structure in accordance with claim 1 wherein said piston head has at least one annular groove formed around its periphery adjacent the upper end thereof, sealing means disposed in said groove and spring means coacting with the sealing means urging the sealing means into sealing engagement with the interior confronting wall surface of said valve housing.

7. A structure in accordance with claim 1 including a hollow elbow depending from said seat, and means on said elbow facilitating fracture thereof in the event that the latter is impacted, thereby preventing damage to said valve means.

8. A structure in accordance with claim 1 wherein said piston head includes vertically spaced circumferential recesses, seals in said recesses, each seal comprising a plurality of stacked V-rings, with one seal being inverted with respect to the direction of the other seal, and spring means coacting with each seal and urging the latter into sealing engagement with the interior of said housing means.

9. A structure in accordance with claim 1 including a hollow elbow integrally formed with and depending from said valve seat, and fastener means for detachably securing the valve means interiorly of a storage tank with said elbow projecting exteriorly thereof.

10. A structure in accordance with claim 1, wherein said biasing means comprises a coil spring coacting between said piston head and a bottom wall section of said housing, said means connecting said piston head to said seat being detachable.

11. A structure in accordance with claim 1, wherein said valve housing comprises a top wall, a cylindrical like side wall, and a bottom wall, an opening in said bottom wall through which said means connecting said piston head to said seat extends, the last mentioned means being adapted to guide the movement of said valve housing with respect to said last mentioned means during application of pressurized fluid to and from said chamber, said last mentioned means and said piston head coacting to provide substantial two location guiding of said valve housing upon reciprocation thereof relative to said valve port, said valve housing being of a greater transverse dimension on its upper portion as compared to its lower portion for providing said balancing means.

12. A remote controlled valve means for a liquid containing tank having a bottom wall, said bottom wall having an opening therein, said value means comprising a valve seat adapted for coaction with the opening and defining a valve port, a hollow cylindrical type valve housing reciprocally disposed on said seat to control the flow of liquid through said port from and to the tank, a piston head disposed in said valve housing forming an actuating chamber above the piston head, means connecting the piston head to said seat whereby said housing is adapted to vertically reciprocate on the piston head relative to said seat, means for biasing said housing to a lowered position relative to the piston head whereby said housing is maintained in normally closed position on the valve seat, means for selectively introducing pressurized fluid into and out of said chamber to reciprocate the housing to and from the valve seat for selectively controlling flow of liquid through said port, means for generally hydraulically balancing said housing whereby said biasing means is effective to move said housing to closed position during bottom loading of the tank upon predetermined exhaustion of pressurized fluid from said actuating chamber, and including a tank in which said valve means is mounted, the latter comprising a liquid discharge elbow secured to the valve seat and being in communication with said port, said elbow having a peripheral notch therein adapted for aiding in rupture of the elbow upon impact of the latter, a filter screen disposed interiorly of the tank above the discharge port for filtering liquid passing through said port, said screen having a lower peripheral flange portion disposed between the elbow and the tank to retain the screen in position.

13. The structure in accordance with claim 12 wherein said means for selectively introducing pressurized fluid into and out of said chamber includes a passageway leading from a side of said elbow to said chamber, the introduction of pressurized fluid into said chamber via said passageway causing movement of said valve housing away from said valve seat, a portion of said passageway being supported by said vane means.

* * * * *